(12) United States Patent
Nammi et al.

(10) Patent No.: US 9,124,329 B2
(45) Date of Patent: Sep. 1, 2015

(54) METHODS OF DETERMINING RANK INFORMATION AND RELATED COMMUNICATIONS DEVICES AND SYSTEMS

(75) Inventors: Sairamesh Nammi, Stockholm (SE); Narendra Tilwani, Addison, TX (US); Pulin Chhatbar, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 881 days.

(21) Appl. No.: 13/152,699

(22) Filed: Jun. 3, 2011

(65) Prior Publication Data
US 2012/0307927 A1 Dec. 6, 2012

(51) Int. Cl.
 H04B 7/00 (2006.01)
 H04B 7/06 (2006.01)
 H04B 17/27 (2015.01)
 H04B 7/04 (2006.01)

(52) U.S. Cl.
 CPC .............. *H04B 7/063* (2013.01); *H04B 17/27* (2015.01); *H04B 7/0413* (2013.01)

(58) Field of Classification Search
 CPC ..... H04W 68/00; H04W 68/04; H04W 28/22; H04W 40/02; H04B 17/0072; H04B 1/7143; H04B 7/022; H04B 7/0413; H04B 7/0491; H04B 7/063; H04B 7/0667; H04B 7/0691; H04B 7/0848

USPC .......... 455/63.1, 296, 436, 450, 456.1, 456.2, 455/456.3, 500, 522; 370/252, 310, 328, 370/329, 331, 360; 375/220, 267; 359/357.72, 359
 See application file for complete search history.

(56) References Cited

U.S. PATENT DOCUMENTS

| 2009/0201825 A1* | 8/2009 | Shen et al. ..................... 370/252 |
| 2012/0128084 A1* | 5/2012 | Aguirre et al. ................. 375/260 |
| 2013/0028207 A1* | 1/2013 | Okubo et al. .................. 370/329 |
| 2013/0058246 A1* | 3/2013 | Li et al. ......................... 370/252 |

OTHER PUBLICATIONS

Lee, et al: MIMO Technologies in 3GPP LTE and LTE-Advanced, EURASIP Journal on Wireless Communications and Networking, May 31, 2009, Hindawi Publishing Corporation.

* cited by examiner

*Primary Examiner* — Ankur Jain

(57) ABSTRACT

A method of operating a wireless terminal communicating with a base station over a wireless channel may include determining whether the wireless terminal is in an edge area or an interior area of coverage of the base station. Responsive to determining that the wireless terminal is in an edge area of coverage of the base station, a transmit diversity communications rank indicator may be selected to select diversity communications over the wireless channel between the wireless terminal and the base station. Related wireless terminals are also discussed.

18 Claims, 7 Drawing Sheets

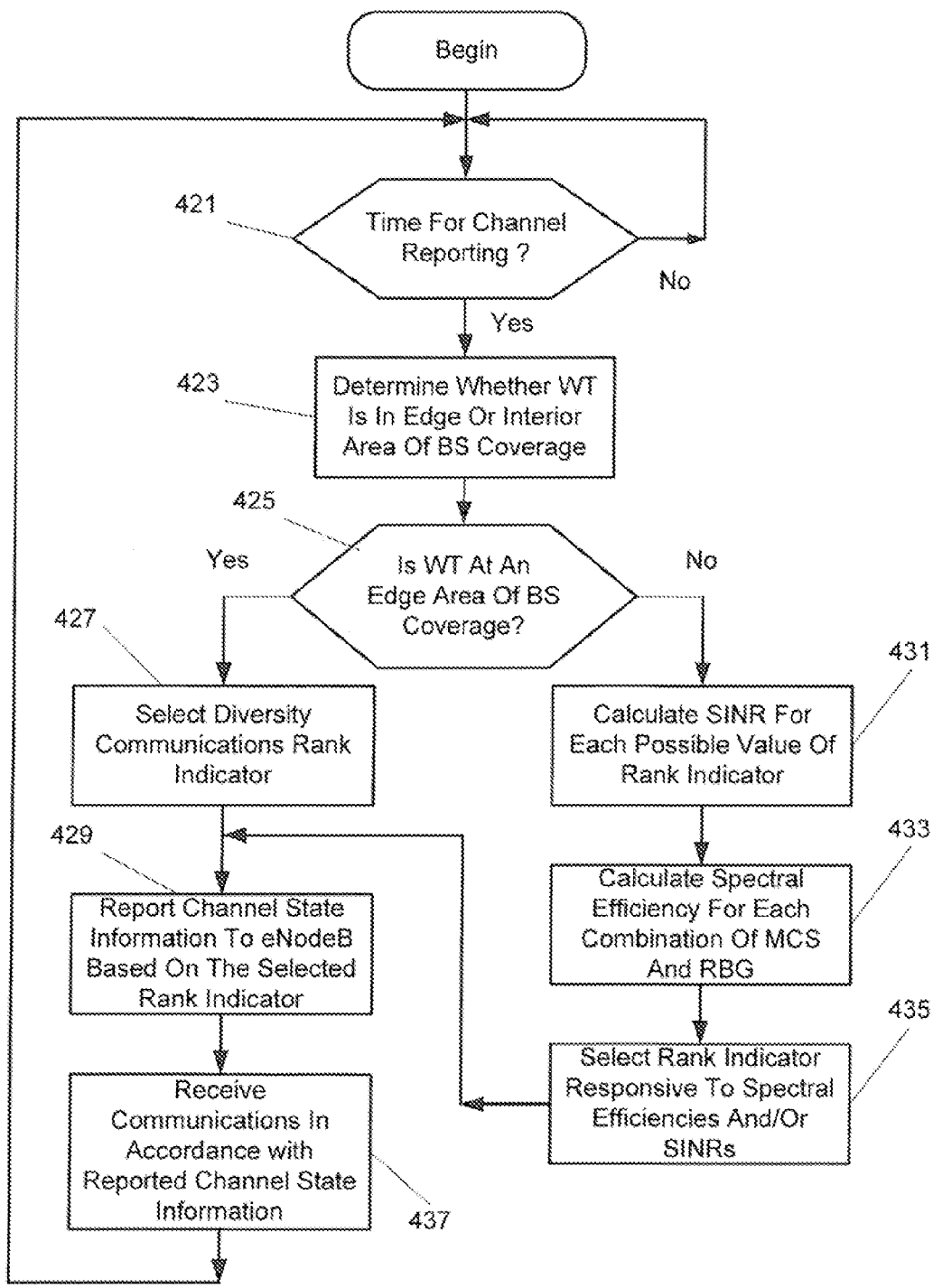

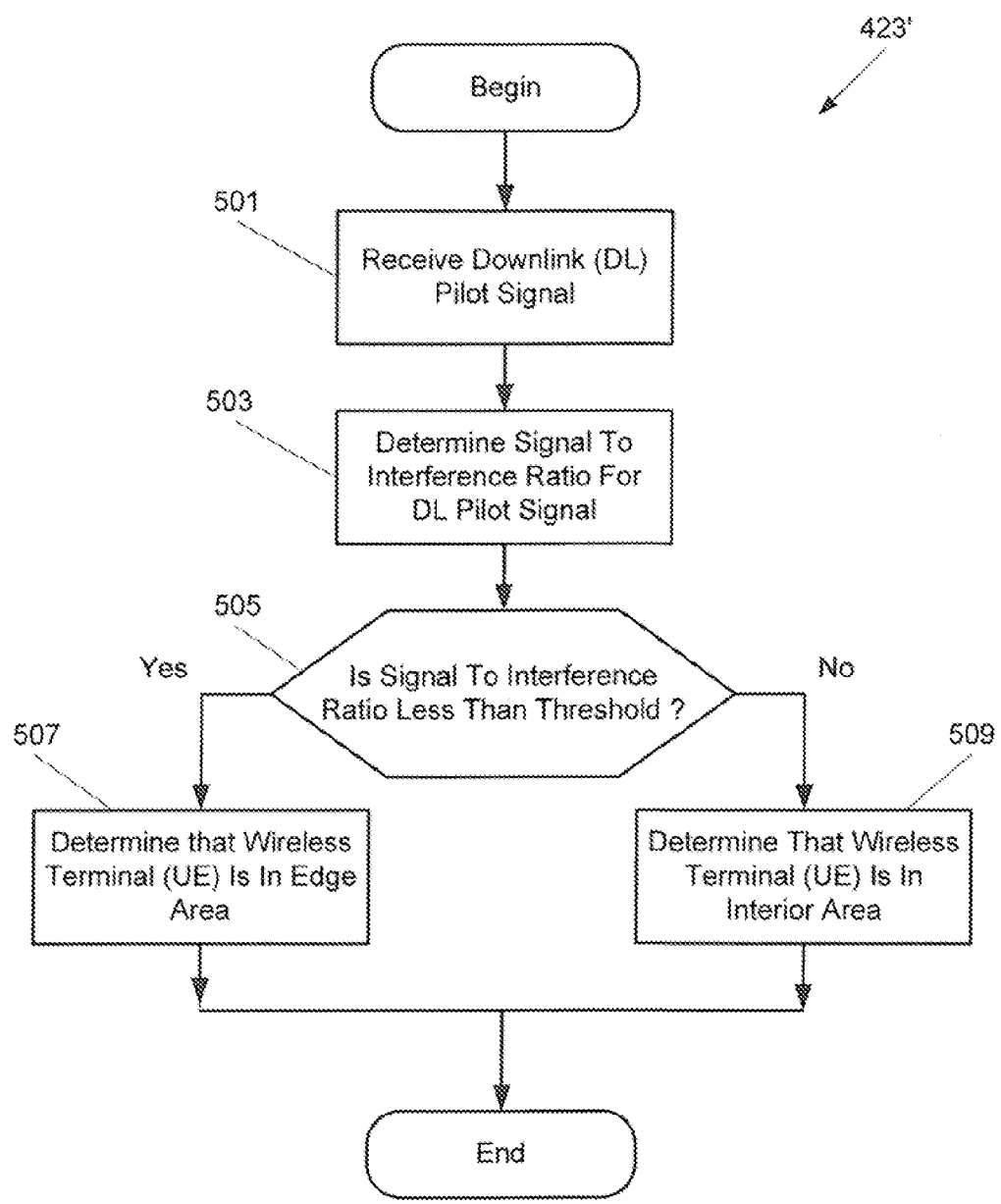

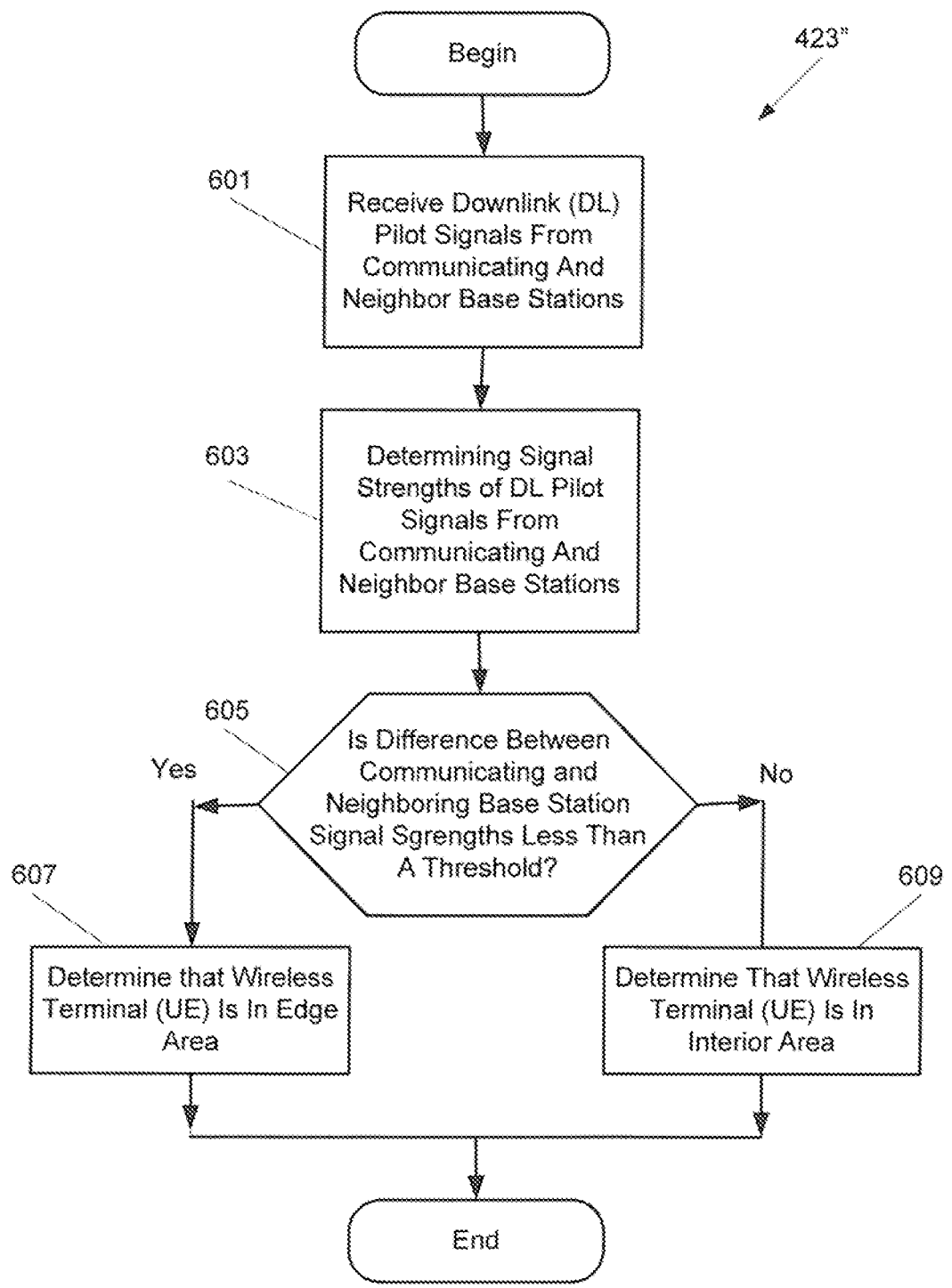

METHODS OF DETERMINING RANK INFORMATION AND RELATED COMMUNICATIONS DEVICES AND SYSTEMS

TECHNICAL FIELD

The present disclosure is directed to network communications and, more particularly, to wireless communications using multiple transmit and receive antennas.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase data rates and/or reliability of a wireless communication system. Performance may be improved if both the transmitter and the receiver are equipped with multiple antennas, which results in a multiple-input multiple-output (MIMO) communication channel. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a diversity mode is provided for relatively high reliability (at lower data rates) in less favorable channel conditions.

In a downlink from a base station transmitting from an antenna array over a MIMO channel to a wireless terminal, spatial multiplexing (according to the spatial multiplexing mode) may allow the simultaneous transmission of multiple symbol streams over the same frequency from different antennas of the base station antenna array. Stated in other words, multiple symbol streams may be transmitted from different antennas of the base station antenna array to the wireless terminal over the same time/frequency resource element (TFRE) to provide an increased data rate. In a downlink from the same base station transmitting from the same antenna array to the same wireless terminal, diversity (according to the diversity mode) may allow the simultaneous transmission of the same symbol stream over the same frequency from different antennas of the base station antenna array. Stated in other words, the same symbol stream may be transmitted from different antennas of the base station antenna array to the wireless terminal over the same time/frequency resource element (TFRE) to provide increased reliability of reception at the wireless terminal due to diversity gain.

The performance of a wireless communication system can thus be improved using multiple antennas at the base station and wireless terminal to provide spatial multiplexing in more favorable channel conditions and to provide diversity gain in less favorable channel conditions. In general, the wireless terminal decides whether to receive in a MIMO diversity mode or a MIMO multiplexed mode, and the wireless terminal reports this decision using a Rank Indicator (RI). For example, a Rank. Indicator of 1 may specify a MIMO diversity mode, and a Rank Indicator of 2 may specify a MIMO multiplexed mode. Moreover, because MIMO downlink channel characteristics vary as a function of many factors including location of the wireless terminal relative to the base station, direction/speed of movement of the wireless terminal, natural and manmade terrain, etc., and because MIMO downlink characteristics and demand for downlink channel capacity may change during a communication, the Rank Indicator (RI) calculations and channel information reporting may be performed by the wireless terminal over the entire band (for example, in 3GPP-LTE, Wi-Max, etc.) at given periods as configured by the base station.

Rank Indicator (RI) choice is generally a function of channel characteristics, correlation between transmit and receive antennas, etc. A conventional approach to choosing a Rank Indicator (RI) is to find Signal to Interference-plus-Noise Ratios (SINRs) for different transmission configurations, and to choose a Rank Indicator for a configuration providing a highest spectral efficiency. In open loop MIMO systems, for example, a wireless terminal may compute a SINR for each possible value of RI and find spectral efficiencies using an exhaustive search of all possible configurations. The wireless terminal may then choose the Rank Indicator for the configuration providing the highest spectral efficiency. If spectral efficiencies of two Rank Indicators are equal, the wireless terminal may then choose the Rank Indicator that maximizes the SINR. The wireless terminal may then repon the selected Rank Indicator (RI). Modulation and Coding Scheme (MSC), and/or Channel Quality Information (CQI) to the base station in a Channel State Information (CSI) report. Similarly burdensome operations may be required for Rank Indicator (RI) and/or Precoder Matrix Indicator (PMI) calculations in closed loop MIMO systems, particularly when the codebook is large.

The requirement for the wireless terminal to periodically determine spectral efficiencies for all possible downlink configurations may place a burden on wireless terminal processing capacity and/or may reduce wireless terminal battery life. Accordingly, there continues to exist a need in the art for methods that reduce a processing capacity required for Channel State Information (CSI) reporting.

SUMMARY

According to some embodiments, a method of operating a wireless terminal communicating with a base station over a wireless channel may include determining whether the wireless terminal is in an edge area or an interior area of coverage of the base station. Responsive to determining that the wireless terminal is in an edge area of coverage of the base station, a transmit diversity communications rank indicator may be selected to select diversity communications over the wireless channel between the wireless terminal and the base station. Responsive to determining that the wireless terminal is in an interior area of coverage of the base station, one of a plurality of rank indicators may be selected wherein the plurality of rank indicators includes the transmit diversity communications rank indicator and a multiplexed communications rank indicator to select multiplexed communications over the wireless channel between the wireless terminal and the base station.

By automatically selecting a diversity communications rank indicator responsive to determining that the wireless terminal is in a edge area of coverage of the base station, a processing capacity required for Channel State Information (CSI) reporting at the wireless terminal may be reduced. As discussed in greater detail below, when a wireless terminal is in an edge area of base station coverage where path-loss is usually greatest, processing capacity used to select the diversity communications rank indicator may be significantly reduced without significantly reducing average data rates for wireless terminals in this edge area. Moreover, automatically choosing the diversity communications rank indicator when wireless terminals are in this edge area may actually increase average data throughputs for the network as compared to wireless terminals that compute SINRs/spectral-efficiencies to calculate a Rank Indicator when in this edge area, thereby improving coverage.

According to some other embodiments, a wireless terminal may be configured to communicate with a base station over a wireless channel. The wireless terminal may include a processor configured to determine whether the wireless terminal is in an edge area or an interior area of coverage of the base station. More particularly, the processor may be configured to select a transmit diversity communications rank indicator to select diversity communications over the wireless channel between the wireless terminal and the base station responsive to determining that the wireless terminal is in an edge area of coverage of the base station. Responsive to determining that the wireless terminal is in an interior area of coverage of the base station, the processor may be configured to select one of a plurality of rank indicators wherein the plurality of rank indicators includes the transmit diversity communications rank indicator and a multiplexed communications rank indicator to select multiplexed communications over the wireless channel between the wireless terminal and the base station.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 4, 5, and 6 are flow charts illustrating operations of wireless terminals according to some embodiments of FIGS. 1, 2, and 3.

DETAILED DESCRIPTION

Figure 1:
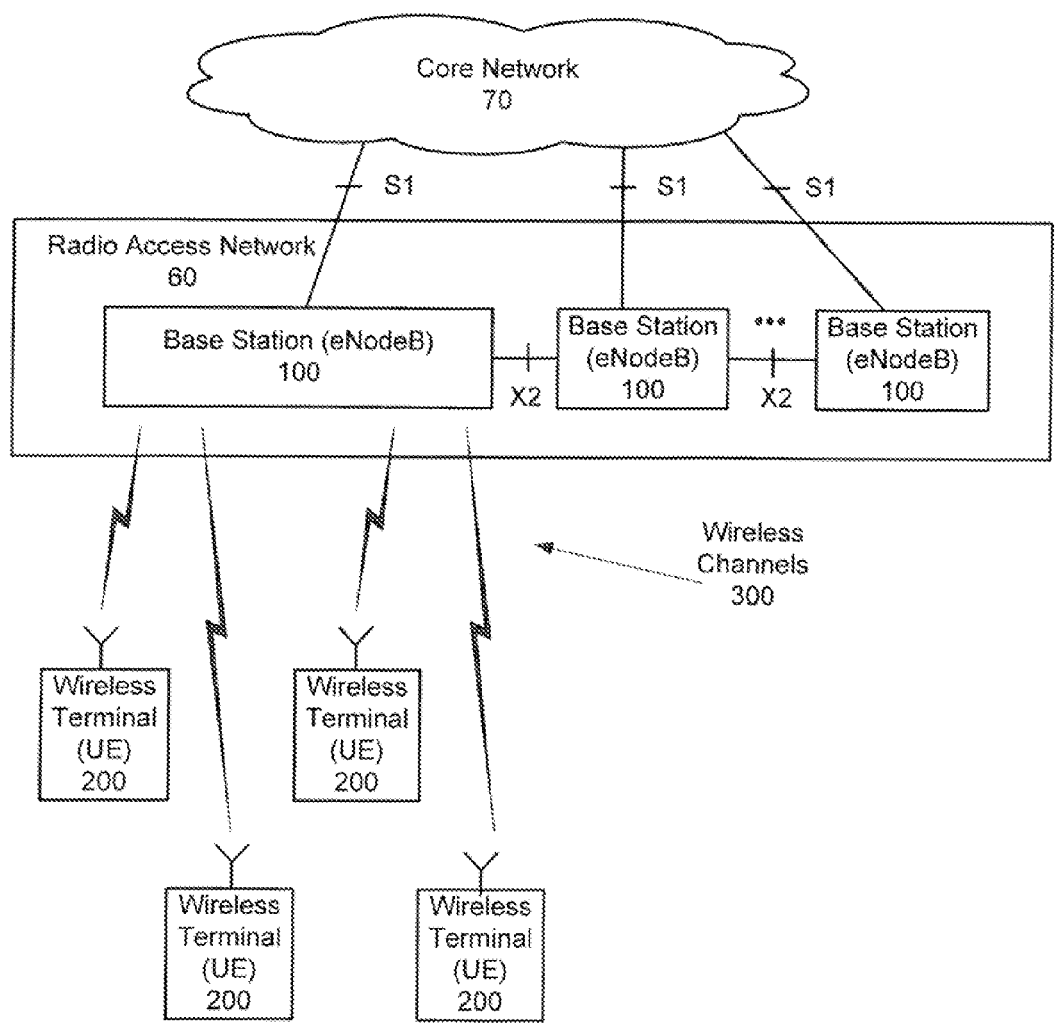
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminals or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband) and GSM (Global System for Mobile Communications), may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
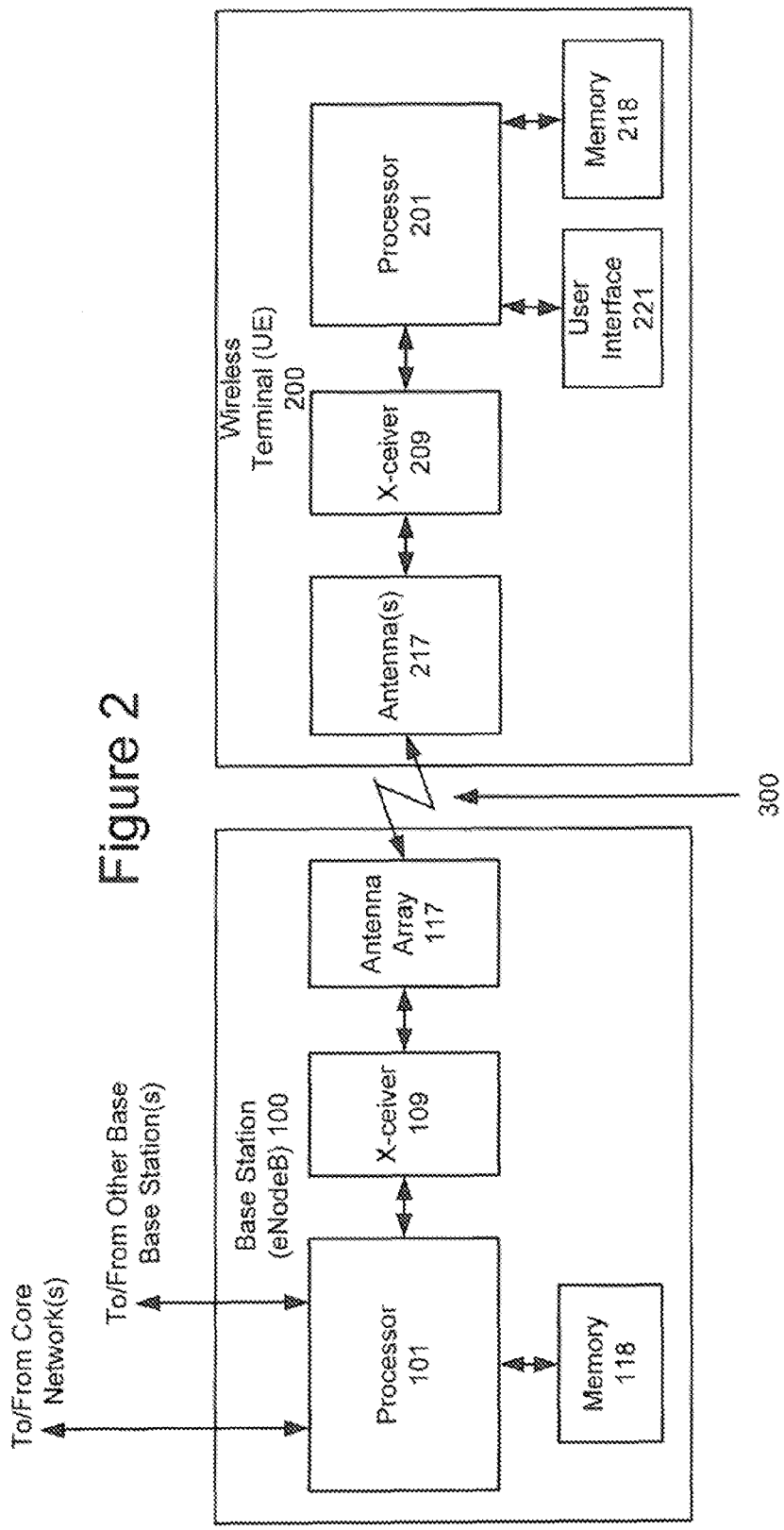
FIG. 2 is a block diagram of a base station and a UE in communication over a wireless channel according to some embodiments of FIG. 1.

FIG. 2 is a block diagram of a base station 100 and a wireless terminal 200 of FIG. 1 in communication over a wireless channel 300 according to some embodiments of the present invention. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna(s) 217 and processor 201, and user interface 221 and memory 218 may be coupled to processor 201. Accordingly, base station 100 may transmit communications through transceiver 109 and antenna array 117 for reception at wireless terminal 200 through antenna(s) 217 and transceiver 209, and wireless terminal 200 may transmit communications though transceiver 209 and antenna(s) 217 for reception at base station 100 through antenna array 117 and transceiver 109.

As discussed herein, a rank indicator may indicate a number of MIMO layers used to provide respective symbol streams in downlink transmissions from base station 100 to wireless terminal 200. A rank indicator of 1, for example, may indicate transmit diversity communications for transmissions from base station 100 to wireless terminal 200 so that the same symbol stream is transmitted from all antennas of antenna array 117 over the same time/frequency resource element to provide increased reliability. A rank indicator of 2 may indicate multiplexed communications for transmission from base station 100 to wireless terminal 200 so that different symbol streams are simultaneously transmitted from respective different antennas of antenna array 117 over the same time/frequency resource element to provide an increased data rate.

Referring again to FIG. 2, UE 200 transceiver 209 is configured to provide wireless communications with base station 100 through antenna(s) 217 and over wireless channel 300. In addition, processor 201 is configured to measure characteristics of wireless channel 300 over which wireless communications are received from base station 100, to select a rank indicator responsive to measuring the characteristics of the wireless channel 300, and to transmit channel state information based on the selected rank indicator to base station 100 through the transceiver 209 and the antenna 217. Processor 201 is then configured to process signals received from the antenna array 117 of the base station 100 in accordance with the reported channel state information and/or the selected rank indicator. MIMO and rank indicators are discussed, for example, in U.S. application Ser. No. 12/973,096 (P32175) entitled "Methods Providing Precoder Feedback Using Multiple Precoder Indices And Related Communications Devices And Systems" and filed Dec. 20, 2010.

Figure 3:
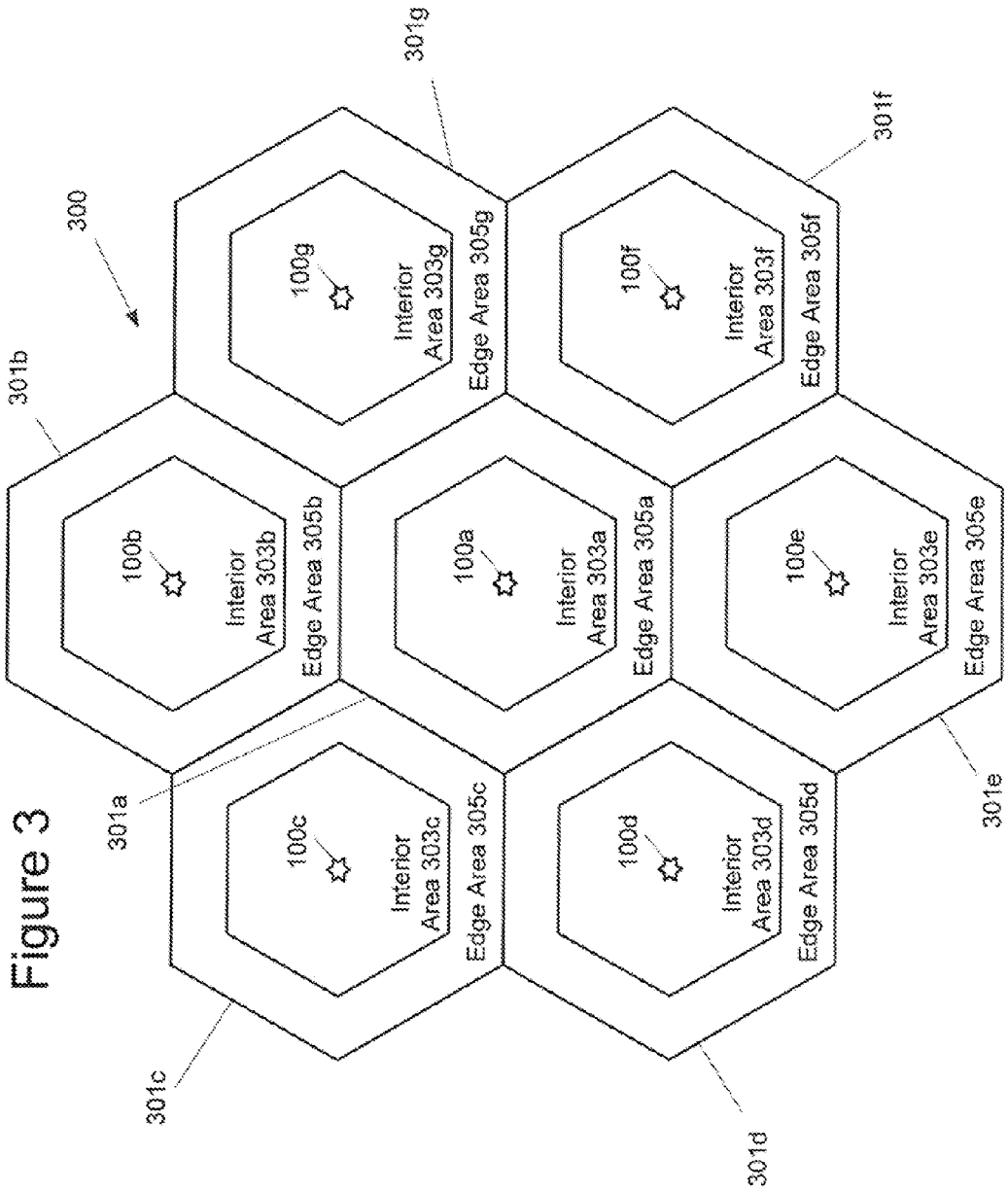
FIG. 3 is a diagram illustrating an array of base stations and respective coverage areas according to some embodiments of FIGS. 1 and 2.

As shown in FIG. 3, RAN 60 of FIG. 1 may be arranged to provide service over a geographic area 300, with each base station 100a to 100g providing service over a respective coverage area (also referred to as a cell) 300a to 300g. More particularly, each base station 100a to 100g may provide coverage over a respective coverage area 300a to 300g with each coverage area including a respective interior area 303a to 303g and a respective edge area 305a to 305g. While seven base stations 100a to 100g and coverage areas 301a to 301 are shown by way of example, RAN 60 may include any number of base stations and cells. Moreover, while coverage areas 301a to 301g are shown as uniformly sized hexagons for ease of illustration, cells may have different shapes and/or sizes as may be needed to support differences, for example, in terrain, traffic, density of users, demand for capacity, etc., over geographic area 300. In addition, a base station 100 may use directional sector antennas to define a plurality of different coverage areas surrounding the base station 100. For example, a base station may include three arrays of directional antennas, with each array defining a respective coverage area spanning 120 degrees around the base station 100 so that the base station effectively provides service over three different pie shaped coverage areas or cells. As will be understood, orthogonality may be provided between adjacent coverage areas or cells by using different frequencies (e.g., Frequency Division Multiple Access or FDMA), codes (e.g., Code Division Multiple Access or CDMA), and/or times for communications within adjacent cells (e.g., Time Division Multiple Access or TDMA).

According to some embodiments, wireless terminal 200 is configured to communicate with base station 100 over wireless channel 300. The wireless terminal 200 may report channel state information (CSI) to the base station 100 to select MIMO diversity communications (corresponding to a transmit diversity communications rank indicator or a rank indicator of 1) or MIMO multiplexed communications (corresponding to a multiplexed communications rank indicator or a rank indicator of 2) for downlink transmissions from the base station 100 to the wireless terminal 200. More particularly, wireless terminal 200 may be configured to select the rank indicator responsive to a location of wireless terminal 200 within a coverage area of 300 of the base station 100 with which the wireless terminal 200 is communicating.

Processor 201 of wireless terminal 200, for example, may be configured to select/reselect a rank indicator periodically (e.g., at set time intervals) and/or responsive to a change in channel characteristics. Once a rank indicator selection is initiated, processor 201 may be configured to provide an indication of location of wireless terminal 200 relative to base station 100, and to use the indication of location to determine whether wireless terminal 200 is in an edge area 305 or an interior area 303 of coverage of the base station 100. Responsive to determining that the wireless terminal 200 is in an edge area (305) of coverage of base station 100, processor 201 may be configured to select the transmit diversity communications rank indicator to select diversity communications over the downlink of the wireless channel 300 from the base station 100 to the wireless terminal 200. Responsive to determining that the wireless terminal 200 is in an interior area 303 of coverage of base station 100, processor 201 may be configured to select one of a plurality of rank indicators including the transmit diversity communications rank indicator and a multiplexed communication rank indicator to select multiplexed communications over the downlink of the wireless channel 300 from the base station 100 to the wireless terminal 200.

As discussed above, antenna array 117 of base station 100 includes a plurality of multiple-input/multiple-output transmit antennas. The transmit diversity communications rank indicator is used to select multiple-input/multiple-output diversity communications (providing a single symbol stream with increased reliability) for transmission from antenna array 117 to wireless terminal 200. The multiplexed communications rank indicator is used to select multiple-input/multiple-output multiplexed communications (providing multiple symbol streams for an increased data rate) for transmission from antenna array 117 to wireless terminal 200.

Processor 201 is configured to generate a channel state information report based on the transmit diversity communications rank indicator responsive to determining that the wireless terminal is in the edge area 305 of coverage of the base station 100 and responsive to selecting the transmit diversity communications rank indicator. In the alternative, processor 201 is configured to generate the channel state information report based on the one of the plurality of rank indicators responsive to determining that the wireless terminal 200 is in an interior area 303 of coverage of the base station 100 and responsive to selecting the one of the plurality of rank indicators. Transceiver 209 is configured to transmit the channel state information report based on the transmit diversity communications rank indicator responsive to the processor 201 generating the channel state information report based on the transmit diversity communications rank indicator, and to transmit the channel state information report based on the one of the plurality of rank indicators responsive to the processor 201 generating the channel state information report based on the one of the plurality of rank indicators.

Responsive to determining that wireless terminal 200 is in an interior area 303 of coverage of base station 100, processor 201 is configured to calculate SINRs and/or spectral efficiencies for each of the plurality of rank indictors and to select the one of the plurality of rank indicators responsive to calculating the SINRs and/or the spectral efficiencies. In contrast, processor 201 may be configured to automatically select the transmit diversity communications rank indicator responsive to determining that wireless terminal 200 is in an edge area 305 of coverage of base station 100 (without calculating SINRs and/or spectral efficiencies for any of the plurality of rank indicators). By automatically selecting the transmit diversity communications rank indicator when wireless terminal 200 is in an edge area 305, processing overhead and/or power consumption associated with calculating SINRs and/or spectral efficiencies for the different rank indicators may be reduced.

According to some embodiments, a downlink control channel pilot signal from base station 100 may be used to provide an indication of location of wireless terminal 200. Transceiver 209, for example, may be configured to receive a downlink control channel pilot signal from base station 100. Processor 201 may be configured to determine a signal strength (e.g., a signal-to-interference-and-noise-ratio or SINR) for the downlink control channel pilot signal. Responsive to the signal strength (e.g., a signal-to-interference-and noise-ratio or SINR) being less than a threshold, processor 201 may determine that wireless terminal is in an edge area 305 of coverage of base station 100. Responsive to the signal strength (e.g., SINR) being greater than the threshold, processor 201 may determine that wireless terminal 200 is in an interior area 303 of coverage of base station 100.

According to some embodiments, downlink control channel pilot signals from communicating and neighboring base stations may be used to provide an indication of location of wireless terminal 200. For example, wireless terminal 200 may be in communication with base station 100a (referred to as the communicating base station 100a), and wireless terminal 200 may be physically located in coverage area 300a between communicating base station 110a and neighboring base station 100b. Transceiver 209 may receive downlink pilot signals from the adjacent communicating and neighboring base stations 101a and 101b, and processor 201 may determine signal strengths of the downlink pilot signals from the communicating and neighboring base stations 101a and 101b. More particularly, processor 201 may be configured to determine that wireless terminal 200 is in an edge area 305a of coverage of the communicating base station 100a responsive to a difference and/or ratio of the signal strengths (e.g., SINRs) of the downlink control channel pilot signals being less than a threshold, and to determine that wireless terminal 200 is in an interior area 303a of coverage of the communicating base station 100a responsive to a difference and/or ratio of signal strengths (e.g., SINRs) of the downlink control channel pilot signals being greater than the threshold.

Processor 201 and/or memory 218 of wireless terminal 200, for example, may maintain a neighbor list identifying additional base stations neighboring (e.g., adjacent to) base station 100 with which wireless terminal 200 is communicating and identifying downlink control channels for these neighboring base stations. By receiving pilot signals for the control channels of these neighboring base stations and for the control channel of the communicating base station 100, processor 201 may determine signal strengths (e.g., SINRs) for the control channels of the neighboring and communicating base stations. Processor 201 may select a neighboring control channel having a greatest received signal strength (e.g., SINR) of the neighboring control channels identified in the neighbor list, and processor 201 may compare this greatest signal strength of the neighbor control channels with a signal strength (e.g., SINR) of the control channel of base station 100 to determine whether wireless terminal 200 is in an edge area or an interior area of coverage of base station 100. For example, if a difference between the received signal strengths is above a threshold (i.e., if the received signal strength of the communicating base station control channel is sufficiently greater than that of the neighboring base station control channel(s)), processor 201 may determine that wireless terminal 200 is in an interior portion of coverage of communicating base station. If the difference is less than the threshold (i.e., if the received signal strengths of the communicating base station and a neighboring base station are not significantly different), processor 201 may determine that terminal is in an edge area of coverage.

According to some other embodiments, base station 100 may provide an indication of location of wireless terminal 200 that can be used to determine whether the wireless terminal is located in an interior or edge area of coverage of base station 100. Transceiver 209 may receive an indication of location of the wireless terminal 200 from the base station 100, and processor 201 may determine whether the wireless terminal 200 is in an edge area or an interior area of coverage of base station 100 responsive to receiving the indication of location through transceiver 209. RAN 60, for example, may use timing information for wireless terminal 100 signals transmitted/received from/at a plurality of different communicating/neighboring base stations 100 to determine a position of wireless terminal 200, and an indication of position of wireless terminal 200 may be calculated responsive to the timing information and transmitted to wireless terminal 200.

According to still other embodiments, processor 201 may be configured to determine whether wireless terminal 200 is in an edge area 305 or an interior area 303 of coverage of base station 100 based on at least one of global positioning signals from global positioning satellites, a round trip delay calculation based on a ping from base station 100 to wireless terminal 200 and back to base station 100, a round trip delay calculation based on a ping from the wireless terminal 200 to the base station 100 and back to the wireless terminal 200 (e.g., using triangulation), and/or wireless terminal positioning based on triangulation of signals between the wireless terminal 200 and a plurality of base stations 100.

FIGS. 4-6 are flow charts illustrating operations of selecting rank indicators according to some embodiments. As discussed above, processor 201 may be configured at block 421 to determine when to initiate channel state information (CSI) reporting. For example, processor 421 may initiate channel state information (CSI) periodically (e.g., at a predetermined time interval), responsive to detecting a sufficient change in a characteristic(s) of wireless channel 300, etc. At block 423, processor 201 may determine whether wireless terminal (WT) 200 is in an edge area 305 or interior area 303 of base station coverage, for example, by providing an indication of location of wireless terminal 200 relative to base station 100.

Responsive to determining that the wireless terminal 200 is in an edge area 305 of coverage of the base station 100 at block 425, processor 201 may select a transmit diversity communications rank indicator to automatically select diversity communications over the wireless channel 300 between the wireless terminal 200 and the base station 100 at block 427. Responsive to determining that the wireless terminal 200 is in an interior area 303 of coverage of the base station 100 at block 425, processor 201 may select one of a plurality of rank indicators at blocks 431, 433, 435 wherein the plurality of rank indicators includes the transmit diversity communications rank indicator and a multiplexed communications rank indicator to select multiplexed communications over the wireless channel 300 between the wireless terminal 200 and the base station 100. As noted above, base station 100 antenna array 117 includes a plurality of MIMO transmit antennas, and the plurality of rank indicators includes the transmit diversity communications rank indicator to select MIMO diversity communications from the plurality of transmit antennas of the base station 100 to the wireless terminal 200 and the multiplexed communications rank indicator to select multiple-input/multiple-output multiplexed communications from the plurality of transmit antennas of the base station 100 to the wireless terminal 200.

Responsive to determining that the wireless terminal is in the edge area 305 of coverage of the base station 100 at block 425 and automatically selecting the transmit diversity communications rank indicator at block 427, processor 201 and/or transceiver 209 may report channel state information to the base station 100 based on the transmit diversity communications rank indicator at block 429. Responsive to determining that the wireless terminal 200 is in an interior area 303 of coverage of the base station 100 at block 425 and selecting the one of the plurality of rank indicators at blocks 431, 433, 435, processor 201 and/or transceiver may report channel state information to the base station 100 based on the one of the plurality of rank indicators at block 429.

At block 437, transceiver 209 and/or processor 201 may then receive communications in accordance with the reported channel state information. If the most recently reported channel state information is based on selecting the transmit diversity communications rank indicator, transceiver 209 and/or processor 201 may be configured to receive a single symbol stream transmitted from different antennas of antenna array 117 of base station 100 to provide diversity (and thus providing increased reliability). If the most recently reported channel state information is based on selecting the multiplexed communications rank indicator, transceiver 209 and/or processor 201 may be configured to receive a plurality of symbol streams transmitted from respective different antennas of antenna array 117 of base station 100 to provide spatial multiplexing (and thus provide a higher data rate).

Responsive to determining that wireless terminal 200 is in an interior area 303 of coverage of base station, processor 201 may select from among a plurality of rank indicators based on spectral efficiencies and/or Signal-to-Interference-and-Noise-Ratios (SINRs) at block 435. More particularly, responsive to determining that the wireless terminal 200 is in an interior area 303 of coverage of the base station 100, processor 201 may calculate SINRs for each possible value of rank indicator at block 431, and processor may 201 may calculate spectral efficiencies at block 433 for each combination of Resource Block Group (RBG) and Modulation and Coding Scheme (MCS) at block 433. At block 435, processor 201 may then select one of the plurality of rank indicators responsive to calculating the SINRs and/or the spectral efficiencies. When wireless terminal 200 is located within interior area 303 of base station coverage, processor 201 may thus compute SINRs for each possible value of rank indicator, find spectral efficiencies using an exhaustive search for all possible configurations using the computed SINRs, and choose the rank indicator that maximizes the spectral efficiency. If spectral efficiencies of two rank indicators are substantially equal, processor 201 may choose the rank indictor that maximizes SINR.

According to some embodiments shown in FIG. 5, determining whether the wireless terminal 200 is in an edge area 305 or an interior area 303 of coverage of base station 100 at block 423 may include receiving a downlink control channel pilot signal through transceiver 209 and/or processor 201 from the base station 100 at block 501. Processor 201 may then determine a signal to interference ratio for the downlink control channel pilot signal at block 503, and at block 507, processor 201 may determine that the wireless terminal 200 is in an edge area 305 responsive to the signal strength (e.g., SINR) of the downlink control channel pilot signal being less than a threshold. At block 509, processor 201 may determine that wireless terminal 200 is in an interior area 303 responsive to the signal strength (e.g., SINR) of the downlink control channel pilot signal being greater than the threshold. Stated in other words, a signal strength of the downlink control channel pilot signal may be used to provide an indication of distance from wireless terminal 200 to base station 100 (with greater signal strength indicating lesser distance and with lesser signals strengths indicating greater distance). The signal strength of the downlink control channel pilot signal may thus be used to provide an indication of location (e.g., distance) of wireless terminal 200 relative to base station 100.

According to some embodiments shown in FIG. 6, a comparison of pilot signals from communicating and neighboring base stations may be used to determine whether wireless terminal 200 is in an edge area 305 or an interior are 303 of coverage of the communicating base station. For example, base station 100 may be a communicating base station 100a (also referred to as a serving base station), and at block 601, downlink control channel pilot signals may be received through transceiver 209 and/or processor 201 from communicating base station 100a and from a neighboring base station(s) 100b adjacent communicating base station 100a. At block 603, processor 201 may determine signal strengths (e.g., SINRs) of the downlink control channel pilot signals from communicating base station 100a and from neighbor base station 100b. At blocks 605 and 607, processor 201 may determine that the wireless terminal 200 is in the edge area 305a of coverage of the communicating base station 100a responsive to a difference and/or ratio of the signal strengths of the downlink pilot signals being less than a threshold. At blocks 605 and 609, processor 201 may determine that the wireless terminal 200 is in the interior area 303a of coverage of the communicating base station 100a responsive to a difference and/or ratio of signal strengths of the downlink control channel pilot signals being greater than the threshold. A comparison of control channel pilot signals from communicating and neighboring base stations may thus be used to provide an indication of location of wireless terminal 200 relative to communicating base station 100a.

According to additional embodiments, processor 200 may determine at block 423 whether wireless terminal 200 is in an edge area 305 or an interior area 305 by determining whether wireless terminal 200 is in an edge area 305 or an interior area 303 of coverage based on an indication of location received from base station 100. RAN 60, for example, may use triangulation based on timings of signals transmitted from wireless terminal 200 and received at a plurality of base stations 100 to estimate a location of wireless terminal 200. This estimate of location of wireless terminal 200 may then be transmitted from RAN 60 to wireless terminal 200, and processor 201 can use this estimate of location to determine whether it is in an edge area 305 or an interior area of coverage of base station 100.

According to additional/other embodiments, processor 201 may be configured to determine whether wireless terminal 200 is located in an edge or interior area of coverage of base station 100 based on at least one of: global positioning signals from global positioning satellites; a round trip delay calculation based on a ping from base station 100 to wireless terminal 200 and back to base station 100; a round trip delay calculation based on a ping from wireless terminal 200 to base station 100 and back to wireless terminal 200; and/or wireless terminal positioning based on triangulation of signals between the wireless terminal 200 a plurality of base stations 100. Global positioning signals and triangulation of signals may be used to provide an estimate of a location of wireless terminal 200. Round trip delay calculations may be used to provide an estimate of distance between wireless terminal 200 and base station 100.

Figure 7A:
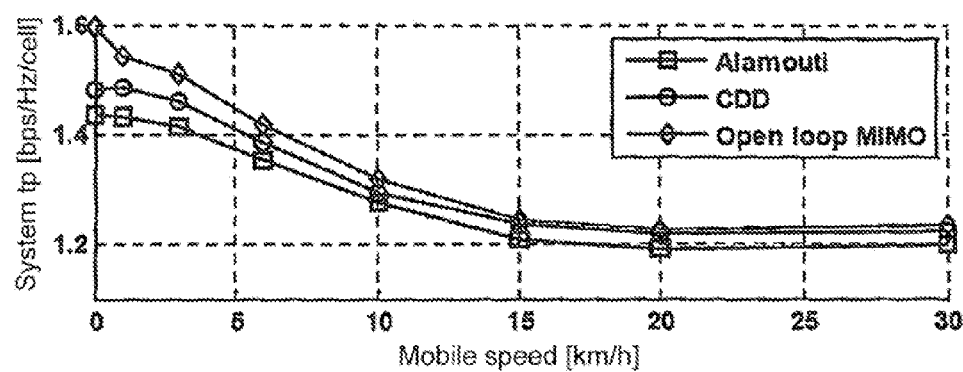
FIGS. 7A and 7B are graphs illustrating simulations of average data throughputs for networks according to some embodiments.
Figure 7B:
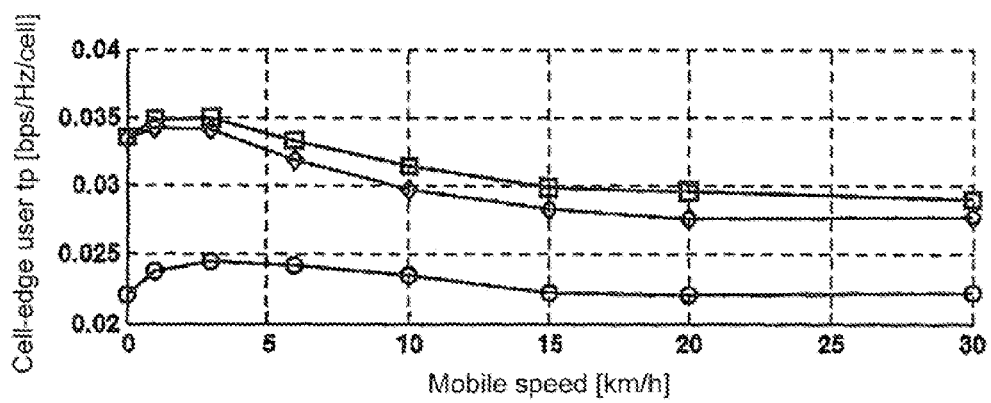

FIGS. 7A and 7B are graphs illustrating results of simulating system throughput according to some embodiments. FIG. 7A illustrates average throughput for all wireless terminals distributed over an area of coverage (including interior and edge areas) of a base station as a function of speed, and FIG. 7B illustrates average throughput for wireless terminals subject to high pathloss which may be assumed to be located in an edge area of coverage. In each graph, the data points indicated by diamonds represents average data throughputs using adaptive open loop MIMO where each wireless terminal selects the rank indicator responsive to computation of signal strength (e.g., SINR) for each value of rank indicator and exhaustive searches used to determine all possible spectral efficiencies as discussed above in the background section of the present application. The data points indicated by circles represent throughput where each wireless terminal is forced to select the multiplexed communications rank indicator (rank=2) regardless of data signal strength (e.g., SINR), spectral efficiency, and/or pathloss. The data points indicated by squares represent average data throughputs where each wireless terminal is forced to select the transmit diversity communications rank indicator (rank=1) regardless of data signal strength (e.g., SINR), spectral efficiency, and/or pathloss. As shown in FIG. 7A where a distribution of wireless terminals across an entirety of base station coverage area is considered, the adaptive model may provide higher average data throughputs, especially at lower wireless terminal speeds of motion. As shown in FIG. 7B where wireless terminals are only considered in edge areas of coverage, forcing selection of diversity may actually improve average data throughputs for these wireless terminals in edge areas while also reducing computational overhead and associated power consumption at the wireless terminals.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of operating a wireless terminal communicating with a base station over a wireless channel, the method comprising:
determining whether the wireless terminal is in an edge area or an interior area of coverage of the base station; and
responsive to determining that the wireless terminal is in an edge area of coverage of the base station, selecting a transmit diversity communications rank indicator that specifies use of a diversity communications mode over the wireless channel between the wireless terminal and the base station;
responsive to determining that the wireless terminal is in an interior area of coverage of the base station, selecting one of a plurality of rank indicators wherein the plurality of rank indicators includes the transmit diversity communications rank indicator and a multiplexed communications rank indicator to select multiplexed communications over the wireless channel between the wireless terminal and the base station;
wherein the base station includes a plurality of multiple-input/multiple-output transmit antennas, and wherein the plurality of rank indicators includes the transmit diversity communications rank indicator to select multiple-input/multiple-output diversity communications from the plurality of transmit antennas of the base station to the wireless terminal and the multiplexed communications rank indicator to select multiple-input/multiple-output multiplexed communications from the plurality of transmit antennas of the base station to the wireless terminal.

2. The method of claim 1, further comprising:
responsive to determining that the wireless terminal is in the edge area of coverage of the base station and responsive to selecting the transmit diversity communications rank indicator, reporting channel state information to the base station based on the transmit diversity communications rank indicator; and
responsive to determining that the wireless terminal is in an interior area of coverage of the base station and responsive to selecting the one of the plurality of rank indicators, reporting channel state information to the base station based on the one of the plurality of rank indicators.

3. The method of claim 1, further comprising:
responsive to determining that the wireless terminal is in an interior area of coverage of the base station, calculating Signal to Interference-plus-Noise Ratios (SINRs) and/or spectral efficiencies for each of the plurality of rank indicators,
wherein selecting the one of the plurality of rank indicators comprises selecting the one of the plurality of rank indicators responsive to calculating the SINRs and/or the spectral efficiencies.

4. The method of claim 1, wherein determining whether the wireless terminal is in an edge area or an interior area of coverage of the base station comprises,
receiving a downlink pilot signal at the wireless terminal from the base station,
determining a signal strength for the downlink pilot signal, and
determining that the wireless terminal is in the edge area responsive to the signal strength being less than a signal strength threshold.

5. The method of claim 1, wherein determining whether the wireless terminal is in an edge area or an interior area of coverage of the base station comprises,
receiving a downlink pilot signal at the wireless terminal from the base station,
determining a signal strength for the downlink pilot signal, determining that the wireless terminal is in the edge area responsive to the signal strength being less than a signal strength threshold, and determining that the wireless terminal is the interior area of coverage of the base station responsive to the signal strength being greater than the signal strength threshold.

6. The method of claim 1, wherein the base station comprises a communicating base station and wherein determining whether the wireless terminal is in an edge area or an interior area of coverage of the base station comprises, receiving downlink pilot signals from the communicating base station and from a neighbor base station adjacent the communicating base station, determining signal strengths of the downlink pilot signals from the communicating and neighbor base stations, and determining that the wireless terminal is in the edge area of coverage of the communicating base station responsive to comparing the signal strengths of the downlink pilot signals.

7. The method of claim 1, wherein the base station comprises a communicating base station and wherein determining whether the wireless terminal is in an edge area or an interior area of coverage of the base station comprises, receiving downlink pilot signals from the communicating base station and from a neighbor base station adjacent the communicating base station, determining signal strengths of the downlink pilot signals from the communicating and neighbor base stations, determining that the wireless terminal is in the edge area of coverage of the communicating base station responsive to a difference and/or ratio of the signal strengths of the downlink pilot signals being less than a difference threshold, and determining that the wireless terminal is in the interior area of coverage of the communicating base station responsive to a difference and/or ratio of signal strengths of the downlink pilot signals being greater than the threshold.

8. The method of claim 1, wherein determining whether the wireless terminal is in an edge area or an interior area of coverage of the base station comprises determining whether the wireless terminal is in an edge area or an interior area of coverage of the base station based on an indication of location of the wireless terminal received from the base station.

9. The method of claim 1, wherein determining whether the wireless terminal is in an edge area or an interior area of coverage of the base station comprises determining whether the wireless terminal is in an edge area or an interior area based on at least one of global positioning signals from global positioning satellites, a round trip delay calculation based on a ping from base station to wireless terminal and back to base station, a round trip delay calculation based on a ping from wireless terminal to base station and back to wireless terminal, and/or wireless terminal positioning based on triangulation of signals between the wireless terminal a plurality of base stations.

10. A wireless terminal configured to communicate with a base station over a wireless channel, the wireless terminal comprising:

a processor configured to determine whether the wireless terminal is in an edge area or an interior area of coverage of the base station, and configured to select a transmit diversity communications rank indicator that specifies use of a diversity communications mode over the wireless channel between the wireless terminal and the base station responsive to determining that the wireless terminal is in an edge area of coverage of the base station;

wherein the processor is further configured to select one of a plurality of rank indicators responsive to determining that the wireless terminal is in an interior area of coverage of the base station, wherein the plurality of rank indicators includes the transmit diversity communications rank indicator and a multiplexed communications rank indicator to select multiplexed communications over the wireless channel between the wireless terminal and the base station; and wherein the base station includes a plurality of multiple-input/multiple-output transmit antennas, and wherein the plurality of rank indicators includes the transmit diversity communications rank indicator to select multiple-input/multiple-output diversity communications from the plurality of transmit antennas of the base station to the wireless terminal and the multiplexed communications rank indicator to select multiple-input/multiple-output multiplexed communications from the plurality of transmit antennas of the base station to the wireless terminal.

11. The wireless terminal of claim 10, wherein the processor is further configured to generate a channel state information report based on the transmit diversity communications rank indicator responsive to determining that the wireless terminal is in the edge area of coverage of the base station and responsive to selecting the transmit diversity communications rank indicator, and to generate a channel state information report based on the one of the plurality of rank indicators responsive to determining that the wireless terminal is in an interior area of coverage of the base station and responsive to selecting the one of the plurality of rank indicators, the wireless terminal further comprising:

a transceiver coupled to the processor, wherein the transceiver is configured to transmit the channel state information report based on the transmit diversity communications rank indicator responsive to the processor generating the channel state information report based on the transmit diversity communications rank indicator, and to transmit the channel state information report based on the one of the plurality of rank indicators responsive to the processor generating the channel state information report based on the one of the plurality of rank indicators.

12. The wireless terminal of claim 10, wherein the processor is further configured to calculate Signal to Interference-plus-Noise Ratios (SINRs) and/or spectral efficiencies for each of the plurality of rank indictors responsive to determining that the wireless terminal is in an interior area of coverage of the base station, and to select the one of the plurality of rank indicators responsive to calculating the SINRs and/or the spectral efficiencies.

13. The wireless terminal of claim 10, further comprising:

a transceiver coupled to the processor, wherein the transceiver is configured to receive a downlink pilot signal from the base station;

wherein the processor is configured to determine whether the wireless terminal is in an edge area or an interior area of coverage of the base station by determining a signal strength for the downlink pilot signal, and by determining that the wireless terminal is in the edge area responsive to the signal strength being less than a signal strength threshold.

14. The wireless terminal of claim 10, further comprising:

a transceiver coupled to the processor, wherein the transceiver is configured to receive a downlink pilot signal from the base station;

wherein the processor is configured to determine whether the wireless terminal is in an edge area or an interior area of coverage of the base station by determining a signal strength for the downlink pilot signal, by determining that the wireless terminal is in the edge area responsive to the signal strength being less than a signal strength threshold, and by determining that the wireless terminal is the interior area of coverage of the base station responsive to the signal strength being greater than the signal strength threshold.

15. The wireless terminal of claim 10, wherein the base station comprises a communicating base station, the wireless terminal further comprising:
   a transceiver coupled to the processor, wherein the transceiver is configured to receive downlink pilot signals from the communicating base station and from a neighbor base station adjacent the communicating base station;
   wherein the processor is configured to determine whether the wireless terminal is in an edge area or an interior area of coverage of the base station by determining signal strengths of the downlink pilot signals from the communicating and neighbor base stations, and by determining that the wireless terminal is in the edge area of coverage of the communicating base station responsive to a difference and/or ratio of the signal strengths of the downlink pilot signals being less than a difference threshold.

16. The wireless terminal of claim 10, wherein the base station comprises a communicating base station, the wireless terminal further comprising:
   a transceiver coupled to the processor, wherein the transceiver is configured to receive downlink pilot signals from the communicating base station and from a neighbor base station adjacent the communicating base station;
   wherein the processor is configured to determine whether the wireless terminal is in an edge area or an interior area of coverage of the base station by determining signal strengths of the downlink pilot signals from the communicating and neighbor base stations, by determining that the wireless terminal is in the edge area of coverage of the communicating base station responsive to a difference and/or ratio of the signal strengths of the downlink pilot signals being less than a difference threshold, and by determining that the wireless terminal is in the interior area of coverage of the communicating base station responsive to a difference and/or ratio of signal strengths of the downlink pilot signals being greater than the difference threshold.

17. The wireless terminal of claim 10, further comprising:
   a transceiver coupled to the processor, wherein the transceiver is configured to receive an indication of location of the wireless terminal from the base station;
   wherein the processor is configured to determine whether the wireless terminal is in an edge area or an interior area of coverage of the base station responsive to receiving the indication of location through the transceiver.

18. The wireless terminal of claim 10, wherein the processor is configured to determine whether the wireless terminal is in an edge area or an interior area of coverage of the base station based on at least one of global positioning signals from global positioning satellites, a round trip delay calculation based on a ping from base station to wireless terminal and back to base station, a round trip delay calculation based on a ping from the wireless terminal to the base station and back to the wireless terminal, and/or wireless terminal positioning based on triangulation of signals between the wireless terminal and a plurality of base stations.

* * * * *

UNITED STATES PATENT AND TRADEMARK OFFICE
CERTIFICATE OF CORRECTION

PATENT NO. : 9,124,329 B2  
APPLICATION NO. : 13/152699  
DATED : September 1, 2015  
INVENTOR(S) : Nammi et al.

Page 1 of 1

It is certified that error appears in the above-identified patent and that said Letters Patent is hereby corrected as shown below:

In the specification

In Column 1, Line 67, delete "Rank. Indicator" and insert -- Rank Indicator --, therefor.

In Column 2, Line 27, delete "then repon" and insert -- then report --, therefor.

In Column 2, Line 64, delete "a edge" and insert -- an edge --, therefor.

In Column 7, Line 24, delete "rank indictors" and insert -- rank indicators --, therefor.

In Column 10, Line 17, delete "rank indictor" and insert -- rank indicator --, therefor.

In Column 11, Line 3, delete "processor 200" and insert -- processor 201 --, therefor.

In Column 13, Line 15, delete "(DVD/BlueRay)." and insert -- (DVD/Blu Ray). --, therefor.

In the claims

In Column 16, Line 48, in Claim 12, delete "rank indictors" and insert -- rank indicators --, therefor.

Signed and Sealed this  
Fifteenth Day of March, 2016

Michelle K. Lee  
*Director of the United States Patent and Trademark Office*